United States Patent [19]

Bashnin et al.

[11] 4,297,589
[45] Oct. 27, 1981

[54] SPEED GOVERNOR FOR A HYDROELECTRIC UNIT

[76] Inventors: Oleg I. Bashnin, prospekt Maiorova, 53, kv. 13; Vasily V. Semenov, Moskovsky prospekt, 171, kv. 92; Vasily N. Fedorov, Prazhskaya ulitsa, 23, kv. 61; Nikolai M. Gorbunov, ulitsa Brjusovskaya, 6, kv. 100; Evgeny I. Rodionov, prospekt Raevskogo, 8, kv. 21; Nikolai A. Sorokin, Sredneokhtinsky prospekt, 46, kv. 4, all of Leningrad, U.S.S.R.

[21] Appl. No.: 130,267

[22] Filed: Mar. 14, 1980

[51] Int. Cl.³ .............................................. F01D 17/02
[52] U.S. Cl. .................................... 290/40 R; 415/30
[58] Field of Search ............. 290/40; 416/35; 415/32, 415/43, 36, 38, 40; 60/662; 318/566, 621, 635; 307/230, 237

[56] References Cited

U.S. PATENT DOCUMENTS 3,201,675  8/1965  Curran et al. ...................... 318/635
3,834,830  9/1974  Johncock ............................ 415/40

*Primary Examiner*—J. D. Miller
*Assistant Examiner*—Donald L. Rebsch
*Attorney, Agent, or Firm*—Lackenbach, Lilling & Siegel

[57] ABSTRACT

A speed governor for a hydroelectric unit includes an error sensing means, an integrator and a gate opening control means connected to the output of the integrator for controlling the degree of opening of the turbine gate apparatus. The governor further comprises a limiter connected between the output of the error sensing means and the input of the integrator for limiting the maximum value of the integrator input signal to a limit value equal to the minimum integrator input signal value which insures the maximum permissible rate of change of the degree of opening of the gate apparatus.

2 Claims, 2 Drawing Figures

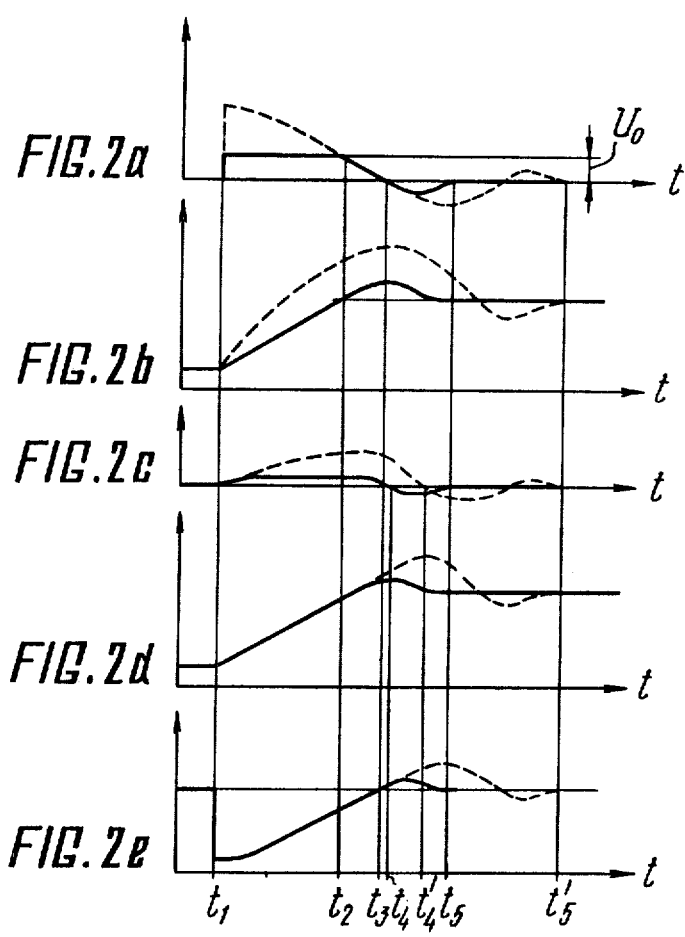

SPEED GOVERNOR FOR A HYDROELECTRIC UNIT

FIELD OF THE INVENTION

The present invention relates to apparatuses for controlling an electrical energy gererating unit and, more particularly, to speed governors for a hydroelectric unit.

The present invention can most advantageously be used in control systems for automatically controlling hydroelectric plants.

BACKGROUND OF THE INVENTION

As is well known, regulation of the rotational frequency of the hydroelectric unit is accomplished by adjusting the degree of opening of the hydraulic turbine gate apparatus and altering thereby the flow of water to the hydraulic turbine runner. To attain a good agreement between the unit rotational frequency and an assigned value, the device controlling the degree of opening of the gate apparatus is provided with an integrating element to insure floating control.

DESCRIPTION OF THE PRIOR ART

Known in the art is a speed governor for a hydroelectric unit including a hydraulic turbine having a gate apparatus for controlling the flow of water to the hydraulic turbine runner; the governor includes an error sensing means for developing a signal representative of a deviation of the hydroelectric unit rotational frequency from the assigned value, an integrator having its input connected to the output of the error sensing means, and a gate opening control means connected to the output of the integrator for adjusting the degree of opening of the gate apparatus in accordance with the value of the integrator output signal (cf. Bulletin No. 07058 "Electric Governor for Hydraulic Turbines" of the Woodward Governor Company).

With a chosen value of the integrator time constant the rate of change of the control signal applied to the gate opening control means from the output of the integrator increases with the increase in the error signal, i.e. in the deviation of the unit rotational frequency from the assigned value. As is well known, the speed at which the guide vanes of the hydraulic turbine gate apparatus move as the degree of opening of the gate apparatus is being changed cannot exceed a certain maximum permissible value chosen so as to avoid a drastic change of pressure in the penstock of the hydroelectric unit, which can arise as a result of a water hammer. Therefore, when deviations of the unit rotational frequency from the assigned value are small and the integrator input signal does not exceed a certain value, the movement speed of the gate apparatus vanes increases along with the increase in the rate of change of the control signal at the output of the integrator, so that a greater deviation in rotational frequency means a greater movement speed of the vanes. In that case variation of the degree of opening of the gate apparatus is delayed relative to variation of the control signal for a time period determined by the inertial properties of the gate opening control means. With great deviations in rotational frequency, however, when the integrator input signal is above the aforementioned value, an increase in the rate of change of the control signal at the output of the integrator does not lead to a further increase in the movement speed of the gate apparatus vanes, which remains equal to the maximum permissible value, so that the time delay in variation of the degree of opening of the gate apparatus in relation to variation of the control signal increases, the increase in said time delay being the greater, the greater the value of the frequency deviation. This leads to an increase in the dynamic error and to a reduction in the governor response speed for large deviations in the rotational frequency.

It is possible to avoid such a disagreement between the rates of change of the integrator output signal and of the degree of opening of the gate apparatus for large deviations in rotational frequency by increasing the integrator time constant. Such an increase, however, is highly undesirable since it results in a slower governor response for small frequency deviations.

SUMMARY OF THE INVENTION

Accordingly, it is an object of the present invention to provide a speed governor for a hydroelectric unit, which insures a reduced dynamic error and a more rapid response for large deviations in the unit rotational frequency without reducing the governor response speed for small deviations in rotational frequency.

It is another object of the present invention to provide a speed governor for a hydroelectric unit, which insures agreement between the rate of change of the integral signal controlling the degree of opening of the turbine gate apparatus and the rate of change of the degree of opening of the gate apparatus for large deviations in the unit rotational frequency without reducing the governor response speed for small deviations in rotational frequency.

With these and other objects in view there is proposed a speed governor for a hydroelectric unit including a hydraulic turbine having a gate apparatus for controlling the flow of water to the hydraulic turbine runner. The governor includes an error sensing means for developing a signal representative of the deviation of the hydroelectric unit rotational frequency from an assigned value, an integrator having its input electrically coupled to the output of the error sensing means, and a gate opening control means connected to the output of the integrator for adjusting the degree of opening of the gate apparatus in accordance with the value of the integrator output signal. According to the invention, the governor further comprises a limiter having its input connected to the output of the error sensing means and its output connected to the input of the integrator for limiting the maximum value of the signal applied to the input of the integrator to a limit value equal to the minimum integrator input signal value which insures the maximum permissible rate of change of the degree of opening of the gate apparatus.

When the proposed governor is employed, a small deviation of the rotational frequency from the assigned value causes, as in known governors, variation of the control signal at the output of the integrator at a rate proportional to the frequency deviation. However, in contradistinction to the known governors, the rate of change of the integrator output signal increases with the increase in rotational frequency deviation only until said rate of change reaches a value which insures the maximum movement speed of the gate apparatus vanes. A further increase in rotational frequency deviation does not lead to an increase in the rate of change of the integrator output signal, said rate of change remaining equal to the minimum value which insures the maximum movement speed of the vanes. This eliminates disagreement between the rate of change of the control signal applied to the gate opening control means from the output of the integrator and the rate of change of the degree of opening of the gate apparatus for large deviations in rotational frequency, so that the time period for which variation in the degree of opening of the gate apparatus is delayed relative to variation in the control signal depends only on the inertial properties of the gate opening control means. This provides a reduction in the dynamic error and an increase in the governor response speed for large deviations in rotational frequency without reducing the governor response speed for small frequency deviations.

It is expedient that the limiter comprise a saturable amplifier having its input connected through a resistor to the output of the error sensing means, and a potentiometer having its resistive element connected in parallel with the output of the saturable amplifier and its movable contact connected to the input of the integrator and through another resistor to the input of the saturable amplifier, so as to form a negative feedback path from the output of said amplifier to the input thereof.

When such a limiter is used, the adjustment of the governor is simplified because it is possible to vary the maximum rate of change of the integrator output signal without producing a change in the integration constant for the error signal.

The aforementioned and other objects of the present invention will become more apparent upon consideration of the following detailed description of the preferred embodiments thereof taken in conjunction with the accompanying drawings, wherein:

BRIEF DESCRIPTION OF THE DRAWINGS

FIGS. 2a-2e are graphs showing curves charcterizing variations of the degree of opening of the gate apparatus and of the unit rotational frequency, as well as signal waveforms obtained at various positions in the governor circuit.

DETAILED DESCRIPTION OF THE INVENTION

Figure 1:
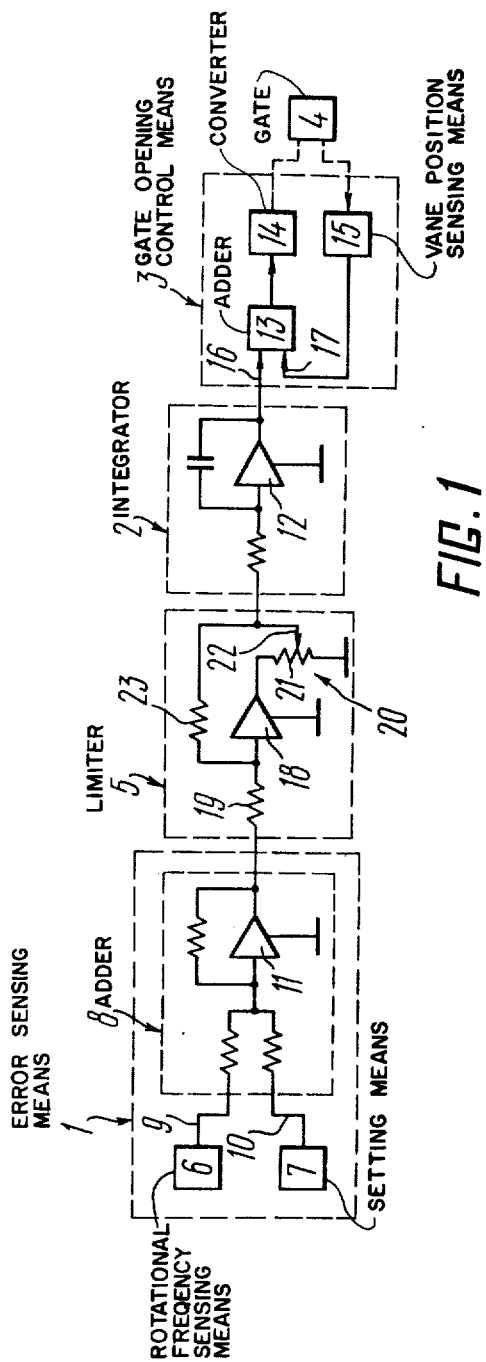
FIG. 1 is a block-diagram of a speed governor for a hydroelectric unit, according to the invention.

Referrring to FIG. 1 the speed governor for a hydroelectric unit (not shown) comprises an error sensing means 1, an integrator 2, a gate opening control means 3 connected to the output of the integrator 2 for controlling the degree of opening of the gate apparatus 4, and a limiter 5 having its input connected to the output of the error sensing means 1 and its output connected to the input of the integrator 2.

The error sensing means 1 comprises a rotational frequency sensing means 6, a setting means 7, and an adder 8. The adder 8 has one input 9 connected to the rotational frequency sensing means 6, a second input 10 connected to the setting means 7, the output of and an adder 8 connected to the output of the error sensing means 1. The rotational frequency sensing means 6 responds to variations of the unit rotational frequency and produces a voltage proportional to the deviation of the unit rotational frequency from the level corresponding to the rated value of the frequency in the power system supplied by the unit (e.g. 50 cycles per second). The setting means 7 produces a signal proportional to the difference between the assigned value of the unit rotational frequency and the level corresponding to the rated value of the power system frequency. Thus the signal developed by the error sensing means 1 is proportional to the deviation of the unit rotational frequency from the assigned value.

The adder 8 comprises an amplifier 11 having a resistor in its negative feedback path, the input of the amplifier 11 being supplied through input resistors with the signals applied to the inputs 9 and 10.

The integrator 2 comprises an amplifier 12 having a capacitor connected in its negative feedback path, the input of the amplifier 12 being supplied through an input resistor with the signal applied to the input of the integrator 2.

The gate apparatus 4 controls the flow of water to the runner (not shown) of the hydraulic turbine (not shown) of the hydroelectric unit by adjusting the position of the gate apparatus guide vanes, and thus the degree of opening of the gate apparatus 4.

The gate opening control means 3 is designed to adjust the position of the vanes of the gate apparatus 4 in accordance with the value of the control signal applied to the control means 3 from the output of the integrator 2. The control means 3 comprises an adder 13, an electrohydraulic converter 14 connected to the output of the adder 13 and adapted to convert the electrical signal at the output of the adder 13 into a mechanical force changing the position of the vanes, and a vane position sensing means 15 responsive to the position of the vanes of the gate apparatus 4. One input 16 of the adder 13 represents the input of the control means 3 and is connected to the output of the integrator 2, the other input 17 of the adder 13 being connected via a negative feedback circuit to the sensing means 15.

The limiter 5 comprises a saturable amplifier 18 having its inverting input connected through an input resistor 19 to the output of the amplifier 11, a potentiometer 20 having its resistive element 21 connected in parallel with the output of the amplifier 18 and its movable contact 22 connected through a resistor 23 to the inverting input of the amplifier 18, thus forming a negative feedback path from the output of the amplifier 18 to its input. The movable contact 22 of the potentiometer 20 is the output terminal of the limiter 5 and is connected to the input terminal of the integrator 2.

The adder 8 of the error sensing means 1 may have an additional input (not shown) which is supplied with a signal from the output of a negative feedback means (not shown), the transfer factor of the negative feedback means being set according to the amount of the governor speed droop. The input of the feedback means may be connected to the vane position sensing means 15 or to the output of the integrator 2. In that case the assigned value of rotational frequency is defined by the sum of the signal applied to the input 10 of the adder 8 and of the feedback signal.

The governor operates as follows.

During steady state operation, when the rotational frequency of the hydroelectric unit equals the assigned value, the signals at the inputs 9 and 10 of the adder 8 counterbalance each other and no voltage is developed at the outputs of the adder 8 and of the limiter 5. The voltage at the output of the integrator 2 equals the value corresponding to the degree of opening of the gate apparatus 4 insuring the assigned rotational frequency of the unit. In this case the voltage applied to the input 16 of the adder 13 from the output of the integrator 2 is balanced out by the voltage applied to the input 17 from the vane position sensing means 15, and no signal is developed at the output of the adder 13.

Upon deviation of the rotational frequency from the assigned value, the balance between the signals at the inputs 9 and 10 of the adder 8 is upset, whereby a signal appears at the output of the adder 8, the value of said signal being proportional to the frequency deviation. This signal is applied to the input of the limiter 5.

If the deviation of rotational frequency is not great, so that the signal applied to the input of the limiter 5 is relatively small and does not drive the amplifier 18 to saturation, the limiter 5 develops an output voltage proportional to its input voltage, i.e. to the frequency deviation. Due to the fact that the output voltage is derived not from the output of the amplifier 18 but from the movable contact 22 of the potentiometer 20, the gain of the limiter 5 is not affected by the position of the movable contact 22 and is determined by the relationship between the values of the resistors 19 and 23:

$$K = (R_1/R_2),$$

where

K is the gain of the limiter 5,
$R_1$ is the value of the resistor 23, and
$R_2$ is the value of the resistor 19.

Therefore, for small deviations in rotational frequency the voltage at the output of the integrator 2 varies at a rate proportional to the frequency deviation. Variation of the integrator output voltage leads to the appearance of a signal at the output of the adder 13, which is converted by the electrohydraulic converter 14 into a mechanical force changing the position of the vanes of the gate apparatus 4 and thereby the degree of opening of the gate apparatus. As a result, the signal at the output of the sensing means 15 changes and compensates for the change in the signal applied to the input 16 of the adder 13 from the output of the integrator 2. Movement of the vanes continues until variation of the integrator output voltage ends, i.e. until the unit rotational frequency during steady state operation equals the assigned value so that the voltage at the output of the adder 8 becomes zero.

The movement speed of the vanes of the gate apparatus 4 is limited and cannot exceed a certain maximum permissible value which is chosen as to avoid a drastic change of pressure in the penstock (not shown) of the hydroelectric unit caused by a water hammer. Therefore, if the rate of change of the voltage at the output of the integrator 2 is below a certain value corresponding to the maximum movement speed of the gate apparatus vanes, an increase or decrease in the rate of change of the integrator output voltage leads to an increase or a decrease, respectively, in the movement speed of the vanes. On the other hand, an increase in the rate of change of the voltage at the output of the integrator 2 above the value corresponding to the maximum movement speed of the vanes cannot produce an increase in the movement speed of the vanes, which speed in such an event will remain constant regardless of the rate of change of the voltage.

The integration constant for the signal applied to the input of the limiter 5 from the error sensing means 1 is chosen so as to obtain a relationship between the deviation in rotational frequency and the movement speed of the gate apparatus vanes, which insures a maximum response speed under stable operational conditions of the control system. The aforementioned integration constant can be adjusted by changing the time constant of the integrator 2 or the relationship between the values of the resistors 19 and 23. The movable contact 22 of the potentiometer 20 is set so that, with the amplifier 18 saturated, the voltage supplied from the movable contact 22 to the input of the integrator 2 is equal to the minimum value, which causes the integrator output voltage to change at a rate insuring the maximum movement speed of the gate apparatus vanes. If the movable contact 22 is set in that manner, large deviations of the unit rotational frequency, exceeding the minimum value at which movement of the vanes should proceed at the maximum speed, will drive the amplifier 18 to saturation, whereas small rotational frequency deviations, below said minimum value, will not bring the amplifier 18 into a saturation state. If the amplifier 18 is not saturated, then, as pointed out above, the position of the movable contact 22 does not affect the gain of the limiter 5 and hence the integration constant for the error signal. Thus the position of the movable contact 22 will have no effect on the governor operation for small deviations in rotational frequency, i.e. when said deviations do not reach the value which causes the gate apparatus vanes to move at the maximum speed.

The operation of the governor for large deviations in rotational frequency is described with reference to FIGS. 2a–2e which show curves characterizing variations of the degree of opening of the gate apparatus 4 (FIG. 1) and of the rotational frequency, as well as signal waveforms obtained at various positions in the governor circuit.

According to the graphs, a deviation of the unit rotational frequency from the assigned value occurs at time $t_1$. In the absence of the limiter 5 (FIG. 1) the variation of the voltage at the input of the integrator 2 at time $t_1$ would have been proportional to the rotational frequency deviation. Variation of the integrator input voltage in the absence of the limiter 5 is shown by a dahsed line in FIG. 2a. In the presence of the limiter 5 (FIG. 1), however, a large deviation in the rotational frequency drives the amplifier 18 to saturation. When the amplifier 18 is saturated, its output voltage is determined by the supply voltage and by the design features of the amplifier 18. Therefore, for large rotational frequency deviations the voltage at the input of the integrator 2 does not depend on the value of the frequency deviation and equals a limit value which is determined only by the position of the movable contact 22. Variation of the voltage applied to the input of the integrator 2 from the output of the limiter 5 is shown in FIG. 2a by a solid line according to which the integrator input voltage at time $t_1$ has the limit value $U_o$.

As long as the difference between the actual rotational frequency and its assigned value remains large enough to keep the amplifier 18 (FIG. 1) in a saturation state, the voltage at the input of the integrator 2 remains constant (see FIG. 2a) and causes the integrator output voltage to vary at a constant rate. Variation of the voltage at the output of the integrator 2 (FIG. 1) is shown by a solid line in FIG. 2b.

Variation of the integrator output voltage upsets the balance between the signals at the inputs 16 and 17 (FIG. 1) of the adder 13 of the control means 3, thereby producing a signal at the output of the adder 13 and variation in the degree of opening of the gate apparatus 4, which variation will be delayed relative to variation of the integrator output voltage due to the inertia of the control means 3. Variation of the signal at the output of the adder 13 is shown by a solid line in FIG. 2c, and variation of the degree of opening of the gate apparatus 4 is shown by a solid line in FIG. 2d. With the movable contact 22 (FIG. 1) of the potentiometer 20 set as described above, variation of the degree of opening of the gate apparatus 4 will continue at the maximum speed as long as the amplifier 18 remains in a saturation state.

Variation of the degree of opening of the gate apparatus 4 brings about variation of the rotational frequency of the hydroelectric unit. Variation of the unit rotational frequency takes place with a substantial time delay relative to movement of the vanes of the gate apparatus 4 and is shown by a solid line in FIG. 2e.

At time $t_2$, when the difference between the actual value of the unit rotational frequency and its assigned value decreases to such an extent that the amplifier 18 (FIG. 1) is removed from saturation, the voltage at the input of the integrator 2 begins to decline in proportion to the decrease in said difference (see FIG. 2a), and the rate of change of the integrator output voltage falls off (FIG. 2b). At time $t_3$, when the actual and the assigned values of rotational frequency are equal to each other, the voltage at the input of the integrator 2 (FIG. 1) and the rate of change of its output voltage are zero (FIG. 2a and 2b). Because of the inertia of the control means 3 (FIG. 1) the signal at the output of the adder 13 becomes zero and the degree of opening of the gate apparatus 4 reaches its extremum value somewhat later than time $t_3$ (FIG. 2), i.e. at time $t_4$. Since variation of the unit rotational frequency occurs with a time lag, the degree of opening of the gate apparatus 4 (FIG. 1) at time $t_4$ (FIG. 2d) will differ from the value which insures equality between the value of the unit rotational frequency during steady state operation and its assigned value, as a result of which the rotational frequency will continue to vary until the vanes of the gate apparatus 4 (FIG. 1) settle at time $t_5$ (FIG. 2) in a position corresponding to steady state operation of the hydroelectric unit.

In the absence of the limiter 2 (FIG. 1) a large deviation in the unit rotational frequency would have produced a large change in the voltage at the input of the integrator 2, as shown by the dashed line in FIG. 2a, with the result that variation of the voltage at the output of the integrator 2 (FIG. 1) would have proceeded at a greater rate as shown by a dashed line in FIG. 2b. However, the speed of movement of the gate apparatus vanes during the time period from time $t_1$ to time $t_2$ would remain equal to the maximum permissible value. Therefore, variation of the degree of opening of the gate apparatus 4 (FIG. 1) and of rotational frequency during the time period from time $t_1$ (FIG. 2) to time $t_2$ would have proceeded as shown by the solid lines in FIG. 2d and 2e so that the degree of opening of the gate apparatus 4 (FIG. 1) with the rotational frequency at time $t_2$ (FIG. 2) would have been the same as in the case when the limiter 5 (FIG. 1) is used. This would have lead to an increase in the difference between the output voltage of the integrator 2 and the output voltage of the vane position sensing means 15 at time $t_2$ (FIG. 2), because said difference would have resulted not only from the inertia of the control means 3 (FIG. 1) but also from disagreement between the rate of change of the integrator output voltage and the movement speed of the vanes, the increase in said difference being the greater, the greater the increase in the rotational frequency deviation. As a result, the signal at the output of the adder 13 would have become zero only by time $t_4'$ as shown by a dashed line in FIG. 2c, and the departure of the degree of opening of the gate apparatus 4 (FIG. 1) from its steady-state value would have been greater than the maximum departure of the degree of opening of the gate apparatus 4 in the case when the limiter 5 is used, as can be seen from FIG. 2d wherein variation of the degree of opening of the gate apparatus 4 (FIG. 1) in the absence of the limiter 5 (FIG. 1) is shown by a dashed line. This, in turn, would have lead to an increase in the dynamic error during variation of rotational frequency, as it can be seen from FIG. 2e, wherein variation of rotational frequency in the absence of the limiter 5 (FIG. 1) is shown by a dashed line, and to an increase in the length of the transient process which would have ended only by time $t_5'$ (FIG. 2).

A shorter transient process for large deviations in rotational frequency can be achieved by using various circuits capable of limiting the maximum value of the output signal provided that the limit value is equal to the minimum integrator input signal value which insures the maximum rate of change of the degree of opening of the gate apparatus 4 (FIG. 1) and the integration constant for the error signal insures the required response speed of the governor and stability of the control system for small rotational frequency deviations. The employment of the limiter 5 designed as shown in FIG. 1, however, makes it possible, by changing the position of the movable contact 22 of the potentiometer 20, to vary the maximum rate of change of the integrator output voltage without any change in the integration constant for the error signal and thus simplifies the adjustment of the governor, since adjustment of the maximum rate of change of the integrator output voltage in accordance with the maximum movement speed of the vanes does not require subsequent adjustment of the integration constant.

The present invention provides a reduction in the dynamic error and an increase in the response speed of the hydroelectric unit speed governor for large deviations in the unit rotational frequency without reducing the governor response speed for small deviations in rotational frequency.

While the invention is described herein in terms of the preferred embodiments, numerous modifications may be made without departure from the spirit and scope of the invention as defined in the appended claims.

We claim:

1. A speed governor, for a hydroelectric unit including a hydraulic turbine having a gate apparatus for controlling the flow of water to the hydraulic turbine runner, comprising:

an error sensing means having a signal generated at an output which is representative of a deviation of the hydroelectric unit rotational frequency from an assigned value;

an integrator having an input and an output;

a gate opening control means connected to said output of said integrator and adjusting the degree of opening of said gate apparatus in accordance with the value of the integrator output signal; and a limiter having an input and an output, said input of said limiter being connected to said output of said error sending means, and said output of said limiter being connected to said input of said integrator, said limiter limiting the maximum value of the signal applied to said input of said integrator to a limit value equal to the minimum integrator input signal value which insures a maximum permissible rate of change of the degree of opening of said gate apparatus.

2. A speed governor according to claim 1, wherein said limiter comprises:
   a saturable amplifier having an input and an output;
   a first resistor interconnecting said input of said saturable amplifier and said input of said limiter;
   a potentiometer having a resistive element and a movable contact, said resistive element of said potentiometer being connected in parallel with said output of said saturable amplifier, and said movable contact of said potentiometer being connected to said output of said limiter;
   a second resistor interconnecting said movable contact of said potentiometer and said input of said saturable amplifier to form a negative feedback path from said output of said amplifier to said input of said amplifier.

* * * * *